Dec. 11, 1962 R. STREIT 3,068,325
TELEPHONE SUB-STATIONS INCLUDING TRANSISTORS
Filed June 10, 1957
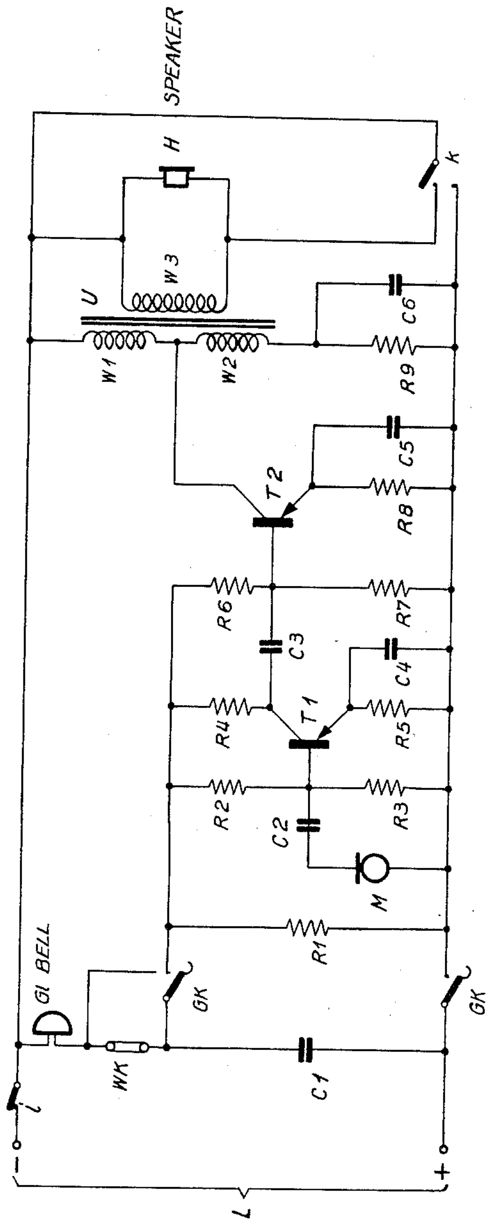
INVENTOR
RUDOLF STREIT
By [signature]
Att'y United States Patent Office 3,068,325

Patented Dec. 11, 1962

3,068,325

TELEPHONE SUB-STATIONS INCLUDING TRANSISTORS

Rudolf Streit, Solothurn, Switzerland, assignor to Autophon Aktiengesellschaft, Solothurn, Switzerland Filed June 10, 1957, Ser. No. 664,813
Claims priority, application Switzerland June 19, 1956
7 Claims. (Cl. 179—81)

This invention relates to telephony, and more particularly to telephone sub-stations including transistors.

The use of transistors has rendered it possible to provide telephone sub-stations including one or several built-in amplifiers which are supplied with direct current via the subscriber's line. These amplifiers, preferably, serve for microphone amplifying purposes and permit the use of microphones, the performance of which is superior to that of carbon microphones, but which are at the same time materially less sensitive. In audio frequency selector systems, the amplifiers may be used to generate audio frequencies, thus permitting solutions of several problems by one and the same expedient.

A telephone sub-station incorporating a system of this kind is distinguished by the characteristic that the same line which serves as a current supply for the amplifiers, serves also for delivering the amplified signal. If the supplies of the voltage dividers generating fixed bias voltages, and of the transistors—except those the output signal of which is passed on the line—were branched directly off the line, such powerful positive or negative feedback would result that the system would be inoperative. The supplies referred to, therefore, must be effected through a filter section formed by at least one resistance or an inductance coil and a condenser. If, for this purpose, a resistance is selected which because of the voltage drop caused thereby, must not exceed a certain size, a comparatively large condenser is required, which is undesirable on the basis of space and cost considerations. When an inductance coil is used especially for this purpose, the condenser required may be smaller but the inductance coil itself gives rise to additional cost and space requirements so the same reasons which militate against the use of a resistance, apply also in the case of the inductance coil.

It is an object of the present invention to avoid these drawbacks, and to provide a telephone sub-station with transistors distinguished by a simplified design and a reduced cost.

Other objects, and the manner in which the same are attained, will become apparent as this specification proceeds.

The invention contemplates the use, for the filtering purposes referred to above, of the bell and the correlated condenser which anyhow form part of the telephone sub-station. The telephone sub-station includes transistors supplied via the subscriber's line, and includes further an alternating current bell connected in series with a condenser. The control electrodes of the transistors are biased by means of voltage dividers. The station is distinguished in that the supply for these voltage dividers and those of the transistors, the output signal of which does not pass on the line, is fed from a point located between the bell and the condenser connected in series therewith.

In the drawing attached to this specification and forming part thereof, one embodiment of the invention is illustrated diagrammatically by way of example.

In the drawing, the sole FIGURE is a wiring diagram of a telephone sub-station according to the invention.

The telephone sub-station illustrated in the drawing includes a bridge circuit containing a differential transformer, a dial and cradle switches. In the place of the customary carbon microphone, the station includes a magnetic microphone and a transistor amplifier correlated therewith.

Referring now to the drawing, the resistances are denoted with R, the condensers with C and the transistors with T. The station is connected with the exchange by the line L, the exchange placing a direct voltage on the line in a manner well known in the art. In view of the presence of the transistors, the polarity must correspond to that shown in the drawing. In the state of rest of the station when, as shown in the drawing, the cradle switches GK are open, only the bell G1, which may be supplemented if desired by a second bell (not shown in the drawing) connected to the terminals WK, and a condenser C1 are connected with the line. If the station is to be called, the exchange passes alternating current on the line in a well known manner so as to actuate the bell or bells. When thereupon the receiver is removed and consequently, the cradle switches GK are closed, a direct current passes from the plus-pole through the resistance R9 and windings W2 and W1 of the differential transformer U to the minus-pole of the line. The mode of function of the differential transformer is sufficiently well known that it requires no detailed description. Insofar as the balancing network, consisting of the elements R9 and C6 which are connected in parallel to one another, with due consideration of the turn's ratio of windings W1 and W2, corresponds to the impedance of the line, the winding W3 of the differential transformer and consequently the receiver H remain, with respect to voltages which are applied between the tap of the transformer and the plus-pole of the line, without current.

The dial or number plate comprises the well known impulse contact *i* and the short-circuit contacts *k*. When the dial is wound up, at first a *k*-contact short-circuits the receiver in order to avoid clicking noises. Thereafter, the second *k*-contact bridges in a well known manner, the entire circuit of the station, in order to prevent the bell from ringing during the dialing procedure, and to lower the resistance of the station to a minimum. The *i*-contact opens the line impulsively.

The microphone amplifier comprises a preliminary stage containing the transistor T1, and a terminal stage containing the transistor T2. Apart from the supply of the collector of the transistor T2, all supplies for the amplifier are taken off between the bell G1 and the bell condenser C1 connected in series therewith. If a second bell is connected to the terminals WK, it is short-circuited by the cradle switch so the resistance conditions are not influenced by such an additional bell. For this supply, the bell, together with the condenser C1, constitutes a low-path filter which filters the voice current from the supply of the amplifier. The resistance R1 forms, together with the bell, a voltage divider which reduces the voltage passed to the amplifier to a suitable value.

The operation of the amplifier is as follows: the microphone M passes the voice voltage via the condenser C2 to the base of the transistor T1. This base receives from the resistances R2 and R3 connected as voltage dividers, a negative bias relative to the plus-pole of the subscriber's line and consequently the emitter. Owing to the amplifying action of the transistor, a current amplified relative to the microphone current passes through the emitter and collector. The resistance R5 which is uncoupled for alternating current by the condenser C4 and which is connected in series with the emitter, exerts, by inverse feedback, a stabilizing effect in that the current passing through it reduces the voltage between the emitter and the base, which in turn effects a reduction of the releasing current. On the resistance R4, an amplified voltage is generated which is passed through the condenser C3 to the terminal stage. This terminal stage which contains the transistor T2, is similarly constructed as the preliminary stage in that the voltage divider consisting of R6 and R7 generates the bias for the base, and the resistance R8, bridged by the condenser C5, stabilizes the current. The output of the amplifier is formed by the emitter and collector of the transistor T2 of the terminal stage. This amplifier output is connected between the tap of the differential transformer U and the plus-pole of the line and thus, takes the place of the carbon microphone in conventional circuits. The supply of the collector of the terminal stage is effected through the winding W1 of the differential transformer. Inasmuch as the alternating voltage generated at the output of the terminal stage must be passed on the line and therefore, anyhow corresponds to this voltage, in this case a filtering is unnecessary, whereas for the reasons explained above, the supply voltage for the remaining elements must not contain the alternating voltage of the line.

The invention is not limited to subscribers' sub-stations equipped with microphone amplifiers. The invention is also susceptible of use in stations wherein the amplifier incorporated therein, is used as an audio frequency generator for audio frequency selection, or alternatingly as a microphone amplifier and an audio frequency generator. The invention is also applicable to stations including two amplifiers where the supply of all circuit elements the output signal of which is not passed on the line, takes place from a point located between the bell and the correlated bell condenser. Stations including two amplifiers lend themselves for use in selecting systems involving the simultaneous emission of two audio frequencies, as well as for use in telephone systems wherein speech in the two directions is transmitted on different frequency bands through the subscriber's line, where amplifiers must be resorted to for speech in both directions. On the other hand, the invention is also applicable to subscribers' stations which contain but a single transistor wherein, possibly, only the voltage divider for generating the bias for the base is supplied via the bell.

I wish it to be understood that I do not intend to be limited to the details of construction, design and operation shown and described as numerous modifications within the scope of the following claims and involving no departure from the spirit of the invention nor any sacrifice of the advantages thereof, are likely to occur to workers in this field.

I claim:

1. In a telephone substation, a first line, a second line, a ringer circuit connected between said first line and said second line, said ringer circuit including an inductive bell and a filter capacitor in series, a transistor amplifier including at least one transistor, said transistor amplifier including an output circuit connected between said lines, said transistor amplifier including a direct current power supply circuit, and means for connecting the power supply circuit of said transistor amplifier to said first and second lines only by connections in shunt with said capacitor, the inductance of said inductive bell and capacitance of said capacitor also providing direct current filter elements for supplying direct current potential from the lines to said supply circuit.

2. The combination according to claim 1 wherein said supply circuit includes a collector electrode connected to the junction of said inductive bell and said filter capacitor and further includes an emitter connected to one of said lines.

3. A combination according to claim 1 wherein is provided a resistive voltage divider connected in shunt to said capacitor, said transistor amplifier including a transistor having an emitter, a base and a collector, means connecting said collector to one side of said capacitor, means connecting said base to an intermediate voltage point of said voltage divider, means connecting said emitter to the other side of said capacitor.

4. The combination according to claim 3 wherein is further provided a microphone coupled between said base and said emitter.

5. The combination according to claim 1 wherein is provided a two stage cascaded transistor amplifier, a first stage of said amplifier including a first transistor having a first emitter, base and collector, a second stage of said amplifier having a second emitter, base and collector, means connecting said first and second emitters to one terminal of said capacitor, a first resistive voltage divider connected across said capacitor, a second resistive voltage divider connected across said capacitor, means connecting the collector of the first stage transistor to the second terminal of said capacitor, means connecting said first base to an intermediate point of said first voltage divider, means connecting said second base to an intermediate point of said voltage divider, a capacitive coupling network coupling said first collector to said second base, an output load for said second collector connected between said second collector and one of said lines.

6. The combination according to claim 5 wherein is provided a balanced transformer having a first and a second primary winding connected in series across said line, and a direct connection from said second collector to the junction of said first and second primary windings.

7. In a telephone substation, a pair of incoming signal lines having a predetermined direct voltage difference therebetween, a ringing circuit connected across said pair of lines, said ringing circuit including an inductive bell and a filter capacitor in series, a transistor having electrodes, and means connecting said electrodes to said lines only across said capacitor, whereby said inductive bell and said filter capacitor also serve as a voltage supply filter for supplying the direct voltage from the lines to said electrodes.

References Cited in the file of this patent

UNITED STATES PATENTS

| | | |
|---|---|---|
| 2,277,623 | Allen | Mar. 24, 1942 |
| 2,502,273 | Patry et al. | Mar. 28, 1950 |
| 2,858,371 | Jones | Oct. 28, 1958 |
| 2,885,478 | Cerofolini | May 5, 1959 |

FOREIGN PATENTS

| | | |
|---|---|---|
| 743,024 | Great Britain | Jan. 4, 1956 |